Nov. 27, 1962  J. R. THOMPSON  3,065,947
CEMETERY POT AND WREATH HOLDER
Filed June 28, 1961

INVENTOR.
JAMES R. THOMPSON
BY B. B. Olive
    Attorney

3,065,947
CEMETERY POT AND WREATH HOLDER
James R. Thompson, 108 E. Markham Ave., Durham, N.C.
Filed June 28, 1961, Ser. No. 125,336
2 Claims. (Cl. 248—361)

This invention relates to a securing device and more especially to a securing device adaptable to securing flower receptacles, wreath stands and the like in cemetery plots.

The principal object of this invention is to provide a device of the kind mentioned which is adaptable to securing both flower receptacles and conventional wreath stands to the cemetery ground so as to prevent them from being easily overturned by wind, children, animals and the like.

A more particular object is to provide a device of this kind which is adaptable in one mode of use to grasping firmly the rim of a flower receptacle and in another mode of use to securing firmly the wreath stand leg and lateral members.

Further objects and advantages of the invention will become apparent from the following description and in the drawing, in which.

Figure 1:
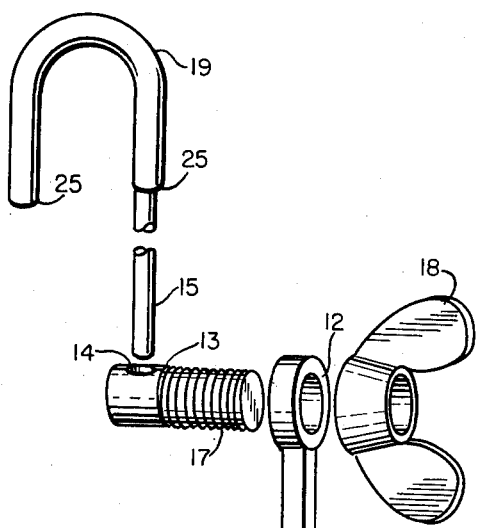
FIGURE 1 is an exploded view showing the manner of assembly of the device.

In carrying out my invention and as disclosed in the accompanying drawing, I provide an elongated ground stake member 10 which should preferably be of rust resistant material and of sufficient rigidity and strength to accommodate itself to both soft and hard soils. Stake 10 is sharpened or pointed at its lower end 11 and at its upper end is formed so as to include a circular opening 12 passing through the body of the stake, the axis of opening 12 being perpendicular to the principal axis of stake 10. Opening 12 is adapted to receive in rotatable relation a short, circular rod 13 having an opening 14 at one end and a threaded portion 17 at the end opposite. Opening 14 has its axis arranged perpendicular to the principal axis of rod 13 and threaded portion 17 is adapted to receive a thumb nut 18.

As indicated in the drawings, opening 14 is sufficiently large so that it may have passed through it either a flower receptacle securing rigid wire member 15 or one of the leg members of a conventional wreath stand 12. When used for securing a flower receptacle, it will be noted that such receptacle, as indicated at 20, is held by means of a bent portion 19 of wire member 15 passing over its rim 22, wire member 15 including a section of plastic tubing 25 or the like to protect rim 22 from damage.

Figure 2:
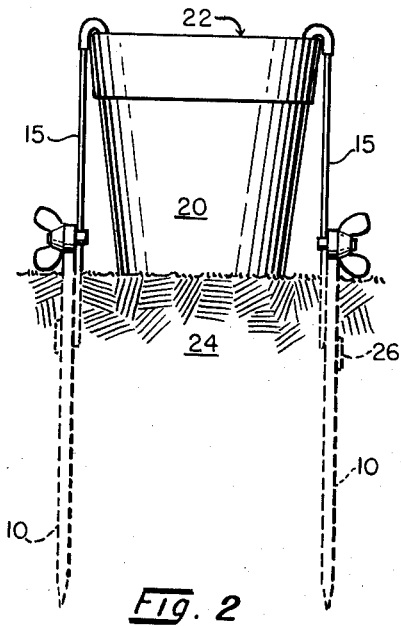
FIGURE 2 is a side elevation showing a pair of the devices securing a flower receptacle.

When being installed, stake member 10 is forced downwardly by suitable means so as to bring the stabilizing fin 26 in engagement with the ground indicated at 24. The portion of stake 10 which includes opening 12 is allowed to reside above the ground. With stake 10 so placed and assuming a flower receptacle is to be secured, wire member 15 is passed through opening 14 until the bent portion 19 resides firmly against the rim 22. At this point, thumb nut 18 is tightened so as to cause member 15 to impinge upon the body of stake 10 which acts to secure member 15 in the particular adjusted position. With a pair of the devices secured in this fashion as indicated in FIGURE 2, I have found that flower receptacles are firmly secured against overturning from any ordinary cause.

Figure 3:
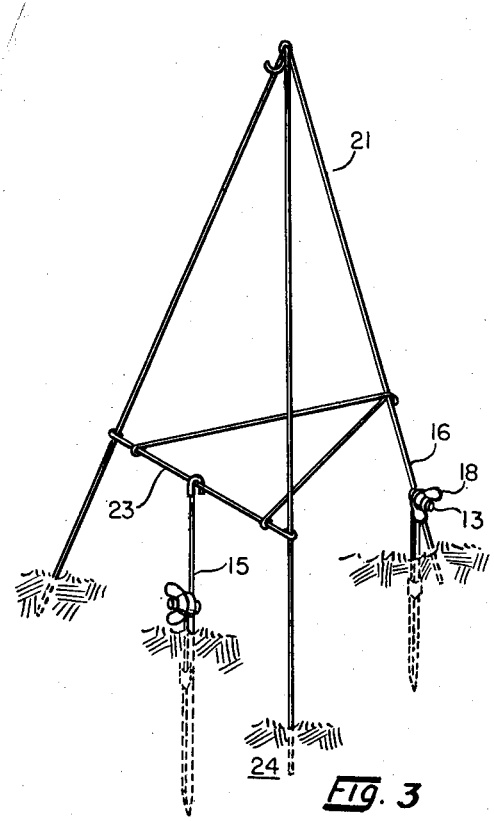
FIGURE 3 is a perspective showing a pair of the devices securing a wreath stand.
Figure 4:
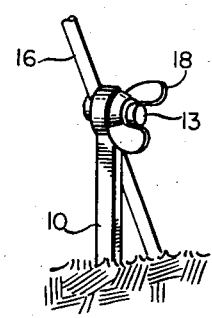
FIGURE 4 is an enlargement of a portion of FIGURE 3.

One of the special advantages of my device is that it can easily be adapted to both flower receptacles and conventional wreath stands. As indicated in FIGURE 3, one of the devices may be utilized by passing the bent portion 19 over the front lateral member 23 of the stand. A second device is then employed without member 15 and in this case the wreath stand rear leg member 16 is passed directly through opening 14 of rod 13 as shown in FIGURE 4 after which thumb nut 18 is tightened as heretofore described. With two of the devices applied to a wreath stand in this manner and in reasonably firm soil, I have found that an exceptional strong and abnormal force is required to upset the stand. As shown in the drawings, it is, of course, preferred that the wreath stand legs themselves at least slightly penetrate the soil in the customary manner at the time my devices are installed.

Having described my invention, I claim:

1. A device for securing a ground supported receptacle having an exposed rim comprising a stake adapted to reside in said ground adjacent said receptacle with a portion thereof including an opening extending above said ground, an elongated pin member rotatably mounted in said stake opening and including an opening passing through one end perpendicular to the longitudinal axis thereof, a rod slidably mounted in said pin opening adjacent said stake and including a bent end adapted to grasp said rim and manual tightening means to bring said rod in tight engagement with said stake.

2. A device for securing ground supported wreath stands and the like of the type having rod like legs extending into said ground, comprising a stake adapted to reside in said ground adjacent one of said legs with a portion thereof including an opening extending above said ground, an elongated pin member rotatably mounted in said stake opening and including an opening passing through one end perpendicular to the longitudinal axis thereof, said pin opening being adapted to slidably mount said one leg and manual tightening means to bring said one leg in tight engagement with said stake.

References Cited in the file of this patent

UNITED STATES PATENTS

| 1,172,347 | Ford | Feb. 22, 1916 |
| 1,313,307 | Locraft | Aug. 19, 1919 |
| 2,289,729 | Robinson | July 14, 1942 |
| 2,842,328 | Youngblood | July 8, 1958 |

FOREIGN PATENTS

| 1,078,224 | France | May 5, 1954 |